United States Patent [19]
Honda

[11] Patent Number: 6,023,583
[45] Date of Patent: Feb. 8, 2000

[54] OPTIMIZED VARIABLE ALLOCATION METHOD, OPTIMIZED VARIABLE ALLOCATION SYSTEM AND COMPUTER-READABLE MEMORY CONTAINING AN OPTIMIZED VARIABLE ALLOCATION PROGRAM

[75] Inventor: Kazushi Honda, Kanagawa-ken, Japan

[73] Assignee: Kabushiki Kaisha Toshiba, Kawasaki, Japan

[21] Appl. No.: 08/957,064

[22] Filed: Oct. 24, 1997

[30] Foreign Application Priority Data

Oct. 25, 1996 [JP] Japan ................................ P08-284312

[51] Int. Cl.[7] ........................................................ G06F 9/45
[52] U.S. Cl. ......................... 395/709; 395/705; 395/707; 395/708; 711/100
[58] Field of Search .................................... 395/709, 700, 395/708, 707, 705; 711/114

[56] References Cited

U.S. PATENT DOCUMENTS 5,530,866  6/1996  Koblenz et al. ........................ 395/700
5,659,704  8/1997  Burkes et al. ........................... 395/441

OTHER PUBLICATIONS

Lai–Hsieh, Reducing Procedure Call Overhead: Optimizing Register Usage at Procedure Call, IEEE, Jun. 1994.
Sugino–Nishihara, Memory Allocation Methods for a DSP with Indirect Addressing Modes and their Application to Compliers, IEEE, Jun. 1997.
Dejean–Zobrist, Definition optimization technique used in a code translation algorithm, ACM, Jan. 1989.

*Primary Examiner*—Tariq R. Hafiz
*Assistant Examiner*—Anthony Nguyen-Ba
*Attorney, Agent, or Firm*—Oblon, Spivak, McClelland, Maier & Neustadt, P.C.

[57] ABSTRACT

An input module reads a source program, and a language translating module performs language translation on the entered source program to generate intermediate code. A dependency relation analyzing module analyzes a dependency relation among the functions contained in the intermediate code, and a variable definition retrieving module obtains from the analyzed dependency relation the execution-time access frequency of each variable. A variable allocating module allocates frequently-accessed variables in a low-order area. A code generating module generates object code from the intermediate code containing information on the allocated variables, and an outputting module outputs the generated object code.

16 Claims, 11 Drawing Sheets

```
int _tiny TINY00, _tiny TINY01;
int _near NEAR00;
int _far FAR00;
```

FIG.3
PRIOR ART

```
int attribute;
int bind;
int _tiny custom;
int arrayz[200];
int _tiny array1[5];
int _tiny array2[5];

tuple(){
    int i;
    int value = array1[0];
    for (i = 0; i < bind ; i++)
        function();
    for (i = 0; i < custom ; i++)
        array2(i) = array1(i) ;
} function(){
    check();
    return attribute++;
}
```

FIG.4
PRIOR ART

```
        public _tuple
_tuple;
        ld      SP,SP-0x2
        push    HL
        ld      HL,0x0
        ld      WA,(_bind)
        cmp     WA,0x0
        j       sle,L1
L2;
        cal     _function
        inc     HL
        ld      WA,HL
        cmp     WA,(_bind)
        j       slt,L2
L1;
        ld      HL,0x0
        ld      WA,(_custom)
        cmp     WA,0x0
        j       sle,L3
        ld      WA,_array1          /31
        ld      (SP+0x3),WA  32
        ld      BC,_array2          /35
L4;
        ld      DE,(SP+0x3)
        ld      WA,(DE)
        ld      DE,BC
        ld      (DE),WA
        inc     HL
        add     BC,0x2
        ld      WA,(SP+0x3)
        add     WA,0x2
        ld      (SP+0x3),WA
        ld      WA,HL
        cmp     WA,(_custom)
        j       slt,L4
L3;
        pop     HL
        ld      SP,SP+0x2
        ret
        public _function
_function;
        cal     _check
        ld      WA,(_attribute)
        ld      BC,WA
        inc     WA
        ld      (_attribute),WA
        ret
```

FIG.5
PRIOR ART

| Location | Object | | Ins | Line | Source Statement | | |
|---|---|---|---|---|---|---|---|
| 0000005F | | | | | public _function | | |
| 0000005F | FC000000 | 81 | +0 | 44 | _function; | | |
| 00000063 | E1000014 | | R +0 | 45 | cal | _check | |
| 00000067 | E815 | 82 | R +0 | 46 | ld | WA,(_attribute) | |
| 00000069 | 10 | | +0 | 47 | ld | BC,WA | |
| 0000006A | F1000010 | | +0 | 48 | inc | WA | |
| 0000006E | 05 | | R +0 | 49 | ld | (_attribute),WA | |
| | | | +0 | 50 | ret | | |

FIG.8

```
int attribute;
int bind;
int custom;
int arrayz[200];
int array1[5];
int array2[5];

tuple(){
   int i;
   int value = array1[0];

for (i = 0; i < bind ; i++)
   function();

for (i = 0; i < custom ; i++)
   array2(i) = array1(i) ;
} function(){
   check();
   return attribute++;
}
```

| attribute | 256 |
|---|---|
| custom | 150 |
| bind | 129 |
| arrayz | 0 |
| array1 | 1 |
| array2 | 1 |

FIG.13

| Location | Object | | Ins | Line | Source Statement |
|---|---|---|---|---|---|
| | | | | | public _function |
| 0000005F | | | | 44 | _function; |
| 0000005F | FC000000) | +0 | 44 | 45 | |
| 00000063 | E00014~91 | R +0 | 45 | 46 | cal _check |
| 00000066 | E815 | R +0 | 46 | 47 | ld WA,(_attribute) |
| 00000068 | 10 | +0 | 47 | 48 | ld BC,WA |
| 00000069 | F00010~92 | +0 | 48 | 49 | inc WA |
| 0000006C | 05 | R +0 | 49 | 50 | ld (_attribute),WA |
| | | +0 | 50 | 51 | ret |

OPTIMIZED VARIABLE ALLOCATION METHOD, OPTIMIZED VARIABLE ALLOCATION SYSTEM AND COMPUTER-READABLE MEMORY CONTAINING AN OPTIMIZED VARIABLE ALLOCATION PROGRAM

BACKGROUND OF THE INVENTION

1. Field of the Invention

The present invention relates to an optimized variable allocation method, optimized variable allocation system, and computer-readable memory containing an optimized variable allocation program, and more particularly to an optimized variable allocation technology which allocates variables efficiently to reduce an object code size of a target program and to increase program execution speed.

2. Description of the Related Art

A program for use on a computer system is developed in the following sequence: a developer creates a source program in a programming language such as C or Fortran, and then the created source program is translated into machine language. In creating a source program, the developer codes, in most cases, statements that perform calculation using variables. These variables are defined to temporarily contain intermediate calculation results.

FIG. 1 is a diagram showing a conventional variable allocation specification method. Where to allocate a variable is explicitly specified by a qualifier at variable declaration time. In FIG. 1, _tiny specifies an 8-bit address area, _near specifies a 16-bit address area, and _far specifies a 24-bit address area. Unless explicitly specified, a variable is usually allocated in the largest area, _far.

FIG. 2 is a diagram showing an example of memory address mapping of _tiny, _near, and _far variables. The _tiny, which indicates the 8-bit address area as described above, ranges from (0x00) to (0xff). The address of a location in this area may be represented by one byte. The _near, which indicates the 16-bit address area, ranges from (0x100) to (0xffff). The address of a location in this area may be represented by two bytes. The _far, which indicates the 24-bit address area, ranges from (0x10000) to (0xffffff). The address of a location in this area may be represented by three bytes.

As you see in the above description, the address of a variable allocated in a low-order address area, such as the _tiny area, may be represented by a smaller number of bits. When translated into object code, a variable allocated in this area requires less space. Therefore, specifying a low-order area for a variable reduces the object code size.

The _tiny area, which requires the smallest number of bits to represent an address, is smallest, it may contain a limited number of variables in many cases. Thus, a programmer has selected frequently-accessed variables and explicitly allocated them in the _tiny area and _near area. The programmer has allocated variables in those areas because of the following two reasons: to reduce the object code size of a statement which accesses the variables allocated in those areas and to speed up the program.

Allocation of frequently-accessed variables in an area, such as _tiny area and _near area where an address may be represented by a smaller number of bits, reduces the object code size of a statement which will access the variables in those areas, thus speeding up the program.

Conventionally, a programmer has explicitly specified where to allocate variables. Actually, however, a program is optimized while it is compiled by a special language translation system and translated into an executable module. This means that, in some cases, some variables are accessed less frequently than anticipated. In addition, as a program becomes larger, it is more difficult to estimate the access frequency of variables precisely, making more difficult to reduce the object code size and to speed up the program.

For example, the source program shown in FIG. 3 contains functions and iteration statements. The number of iterations of the two iteration statements 25 and 26 contained in the function tuple( ), indicated by numeral 23, is not predictable on a source program level.

If the programmer knows that the iteration statement 26 is iterated frequently, he or she estimates that the variables 'array1' and 'array2' declared by the external variable declaration statements 22a and 22b in the iteration statement 26 will be accessed more frequently than the variable 'attribute' declared by the external declaration statement 21.

FIG. 4 shows a program generated by a special intermediate code processing system which optimizes intermediate code generated by a special language translation system. As shown in FIG. 4, the start addresses of the external variables 'array1' and 'array2', which were assumed to be accessed frequently, are loaded into the registers by the load instructions 31 and 32. In FIG. 3, the assignment statement 28 is executed by the instruction group 35 in FIG. 4. In this instruction group, actual assignment is executed through the use of registers. As a result, the external variables 'array1' and 'array2', though assumed to be accessed frequently, are actually accessed only once. That is, the variable 'attribute' declared by the external variable declaration statement 21 is accessed more frequently than the variables 'array1' and 'array2' declared by the external variable statements 22a and 22b.

FIG. 5 is an object code map generated by the above-described method in which the programmer allocates external variables. In this diagram, many bits are used for the addresses of 81 and 82 which are accessed frequently, because the programmer could not estimate that they would be accessed frequently. As a result, the object code size is large and the program is slow.

As described above, it is difficult for the programmer to estimate precisely how frequent an external variable will be accessed. Allocation of external variables by the programmer sometimes brings about a result that does not match what the programmer expected.

SUMMARY OF THE INVENTION

In view of the foregoing, it is an object of the present invention to provide an optimized variable allocation method, optimized variable allocation system, and computer-readable memory containing an optimized variable allocation program which allocate external variables to memory to reduce object code size (program of executable format) of a target program and to speed up the object program.

To achieve the above object, there is provided an optimized variable allocation method comprising the steps of: analyzing an execution-time access frequency of each variable in a source program; and allocating the variable, based on the analyzed access frequency, in such a manner that object code generated from the source program is minimized.

The present invention analyzes the execution-time access frequency of variables in a source program instead of statically analyzing the access frequency of variables in a source program, giving a user more precise information on the execution time access frequency. This allows variables to be allocated in memory more optimally, reduces the object program code size, and executes the object program more speedily.

To achieve the above object, there is provided an optimized variable allocation method comprising the steps of: analyzing an execution-time access frequency of each variable in a source program; and allocating a plurality of variables sequentially in a plurality of areas, based on the analyzed access frequency, with a highest frequency variable in a lowest-order address area.

The present invention sequentially allocates variables with the highest-access-frequency variable in the lowest-address area, allowing frequently-accessed variables to be allocated in an address area in which an address may be represented with a smaller number of bits. This ensures optimized variable allocation in memory and therefore reduces the size of the object program, thus enabling an object program to be executed more speedily.

In a preferred embodiment of the present invention, the access frequency analysis comprises the steps of: optimizing the source program by performing language translation on the source program to generate intermediate code; and analyzing the execution-time access frequency using the intermediate code.

A source program is once translated into intermediate code so that execution-time access analysis is made more easily.

To achieve the above object, there is provided an optimized variable allocation method comprising: a source program inputting step for reading a source program; a language translating step for performing language translation on the input source program to output intermediate code; a dependency relation analyzing step for analyzing a dependency relation among a plurality of functions contained in the intermediate code; a variable definition retrieving step for obtaining an execution-time access frequency of each variable based on the analyzed dependency relation; a variable allocating step for allocating a plurality of high-access-frequency variables in a low-order address area based on the obtained access frequency; and a code generating step for generating object code from the intermediate code containing information on the allocated variables.

The present invention sequentially allocates variables with the highest-access-frequency variable in the lowest-address area, allowing frequently-accessed variables to be allocated in an address area in which an address may be represented with a smaller number of bits. This ensures optimized variable allocation in memory and therefore reduces the size of the object program, thus enabling an object program to be executed more speedily.

In a preferred embodiment of the present invention, an optimized variable allocation method further comprises: an output program outputting step for outputting the generated object code.

In a preferred embodiment of the present invention, the variable definition retrieving step comprises the steps of: determining whether each of functions contained in the intermediate code contains an iteration part and, if at least one of functions contains the iteration part, obtaining an iteration count thereof; assigning a weight, if the iteration part contains a function call, to the function contained in the iteration part, the weight being the obtained iteration count; adding an access frequency of each of variables to access frequency data if access is made to the variable in the iteration part, the access frequency data representing the access frequency of the variable; and adding the access frequency multiplied by the weight to the access frequency data if access is made to the variable in the weighted function.

The present invention allows the access frequency of a variable to be estimated precisely even if iteration statements are included in a source program. This reduces the object program code size, allowing the object program to be executed more speedily. An iteration statement, also referred to as a loop statement, is composed of instructions that are repeated for a fixed number of times. In the C language, the 'for' statement and 'while' statements are iteration statements.

In a preferred embodiment of the present invention, an optimized variable allocation method further comprises the step of obtaining the access frequency of at least one variable outside the iteration part.

To achieve the above object, there is provided an optimized variable allocation system comprising: a source program inputting module for reading a source program; a language translating module for performing language translation on the input source program to output intermediate code; a dependency relation analyzing module for analyzing a dependency relation among a plurality of functions contained in the intermediate code; a variable definition retrieving module for obtaining an execution-time access frequency of each variable based on the analyzed dependency relation; a variable allocating module for allocating a plurality of high-access-frequency variables in a low-order address area based on the obtained access frequency; and a code generating module for generating object code from the intermediate code containing information on the allocated variables.

In a preferred embodiment of the present invention, an optimized variable allocation system further comprises an output program outputting module for outputting the generated object code.

In a preferred embodiment of the present invention, the variable definition retrieving module comprises: means for determining whether each of functions contained in the intermediate code contains an iteration part; means for obtaining an iteration count if at least one of functions contains the iteration part; means for assigning a weight, if the iteration part contains a function call, to the function contained in the iteration part, the weight being the obtained iteration count; means for adding an access frequency of each of variables to access frequency data if access is made to the variable in the iteration part, the access frequency data representing the access frequency of the variable; and means for adding the access frequency multiplied by the weight to the access frequency data if access is made to the variable in the weighted function.

The present invention allows the access frequency of a variable to be estimated precisely even if iteration statements are included in a source program. This reduces the object program code size, allowing the object program to be executed more speedily.

In a preferred embodiment of the present invention, an optimized variable allocation system further comprises means for obtaining the access frequency of at least one variable outside the iteration part.

To achieve the above object, there is provided a computer-readable memory having stored therein an optimized variable allocation program for execution by a computer system, the program comprising: a process for analyzing an execution-time access frequency of each variable in a source program; and a process for allocating the variable, based on the analyzed access frequency, in such a manner that object code generated from the source program is minimized.

The present invention analyzes the execution-time access frequency of variables in a source program instead of statically analyzing the access frequency of variables in a source program, giving a user more precise information on the execution time access frequency. This allows variables to be allocated in memory more optimally, reduces the object program code size, and executes the object program more speedily.

To achieve the above object, there is provided a computer-readable memory having stored therein an optimized variable allocation program for execution by a computer system, the program comprising: a process for analyzing an execution-time access frequency of each variable in a source program; and a process for allocating a plurality of variables sequentially in a plurality of areas, based on the analyzed access frequency, with a highest frequency variable in a lowest-order address area.

The present invention sequentially allocates variables with the highest-access-frequency variable in the lowest-address area, allowing frequently-accessed variables to be allocated in an address area in which an address may be represented with a smaller number of bits. This ensures optimized variable allocation in memory and therefore reduces the size of the object program, thus enabling an object program to be executed more speedily.

In a preferred embodiment of the present invention, the access frequency analysis comprises, for execution by a computer system: a process for optimizing the source program by performing language translation on the source program to generate intermediate code; and a process for analyzing the execution-time access frequency using the intermediate code.

A source program is once translated into intermediate code so that execution-time access analysis is made more easily.

To achieve the above object, there is provided a computer-readable memory having stored therein an optimized variable allocation program for execution by a computer system, the program comprising: a source program inputting step for reading a source program; a language translating step for performing language translation on the input source program to output intermediate code; a dependency relation analyzing step for analyzing a dependency relation among a plurality of functions contained in the intermediate code; a variable definition retrieving step for obtaining an execution-time access frequency of each variable based on the analyzed dependency relation; a variable allocating step for allocating a plurality of high-access-frequency variables in a low-order address area based on the obtained access frequency; and a code generating step for generating object code from the intermediate code containing information on the allocated variables.

The present invention sequentially allocates variables with the highest-access-frequency variable in the lowest-address area, allowing frequently-accessed variables to be allocated in an address area in which an address may be represented with a smaller number of bits. This ensures optimized variable allocation in memory and therefore reduces the size of the object program, thus enabling an object program to be executed more speedily.

In a preferred embodiment of the present invention, a computer program further comprises, for execution by a computer system, an output program outputting step for outputting the generated object code.

In a preferred embodiment of the present invention, the variable definition retrieving step comprises, for execution by a computer system: a process for determining whether each of functions contained in the intermediate code contains an iteration part; a process for obtaining an iteration count if at least one of functions contains the iteration part; a process for assigning a weight, if the iteration part contains a function call, to the function contained in the iteration part, the weight being the obtained iteration count; a process for adding an access frequency of each of variables to access frequency data if access is made to the variable in the iteration part, the access frequency data representing the access frequency of the variable; and a process for adding the access frequency multiplied by the weight to the access frequency data if access is made to the variable in the weighted function.

The present invention allows the access frequency of a variable to be estimated precisely even if iteration statements are included in a source program. This reduces the object program code size, allowing the object program to be executed more speedily.

In a preferred embodiment of the present invention, an optimized variable allocation program further comprises, for execution by a computer system, means for obtaining the access frequency of at least one variable outside the iteration part.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a diagram showing a user-created source program for explaining a conventional variable allocation specification method;

FIG. 4 is a diagram showing intermediate code generated by translating the source program of FIG. 3 by a conventional technology;

FIG. 5 is a diagram showing an object code map generated by the conventional method in which a programmer allocates external variables;

FIG. 8 is a diagram showing a source program used to explain the present invention;

FIG. 13 is a diagram showing an object code map generated by compiling a source program by executing external variable optimized allocation according to the present invention.

DESCRIPTION OF THE PREFERRED EMBODIMENTS

An optimized variable allocation method, optimized variable allocation system, and computer-readable memory containing an optimized variable allocation program are described below with reference to the drawings.

Figures 1, 2:
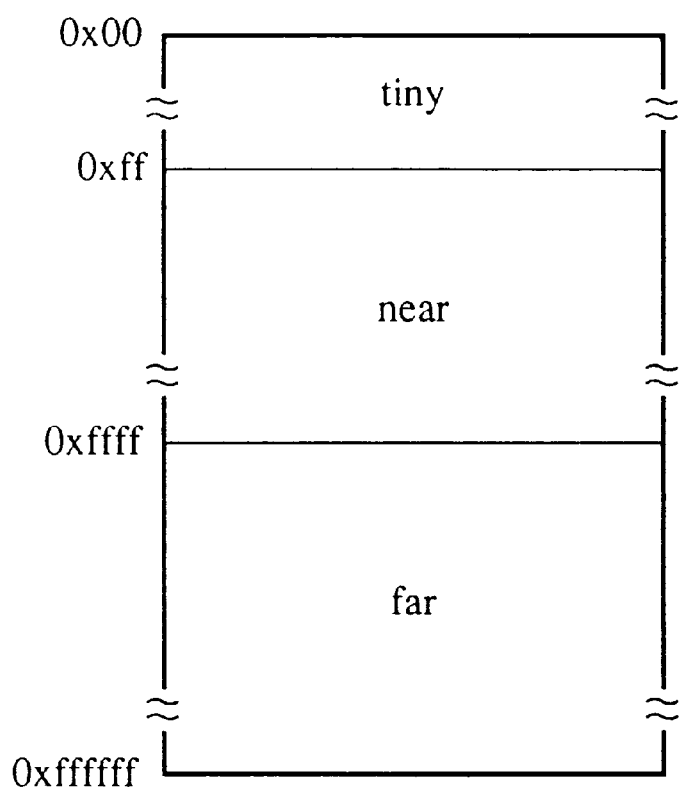
FIG. 1 is a diagram showing a conventional variable allocation specification method.
FIG. 2 is a diagram showing a variable memory mapping.
Figure 6:
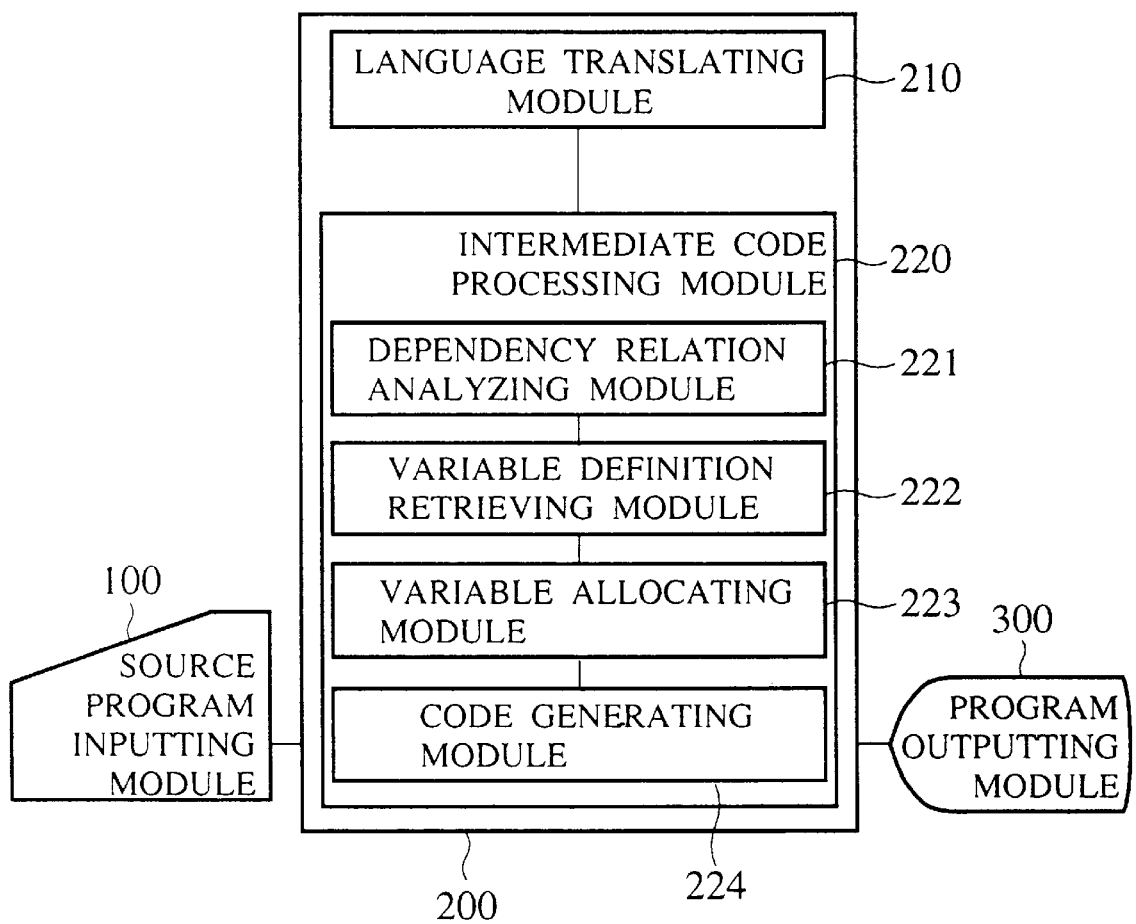
FIG. 6 is a block diagram showing an embodiment of an optimized variable allocation system according to the present invention.

FIG. 6 is a block diagram showing an embodiment of an optimized variable allocation system according to the present invention. The system comprises a source program inputting module 100 which reads a source program, a language translating module 210 which processes an input source program and generates intermediate code, a dependency relation analyzing module 221 which analyzes the dependency relation among the functions contained in intermediate code, a variable definition retrieving module 222 which checks the execution-time access frequency of each variable based on the analyzed dependency relation, a variable allocating module 223 which allocates frequently-accessed variables in a low-order address area based on the analyzed access frequency, a code generating module 224 which generates object code from intermediate code containing variables that have been allocated, and a program outputting module 300 which outputs object code.

The source program inputting module 100 includes units such as a keyboard, light pen, and flexible disk, a processing module 200 is a standard computer system which includes a CPU for processing various types of operation and a storage unit for containing processing statements. The program outputting module 300 includes units such as a display and a printer. The statements and instructions to be processed by the language translating module 210 and an intermediate code processing module 220, stored in the storage unit, are loaded into the CPU as necessary for execution. In most cases, an operator enters an instruction (command) from the source program inputting module 100 to control execution.

Figure 7:
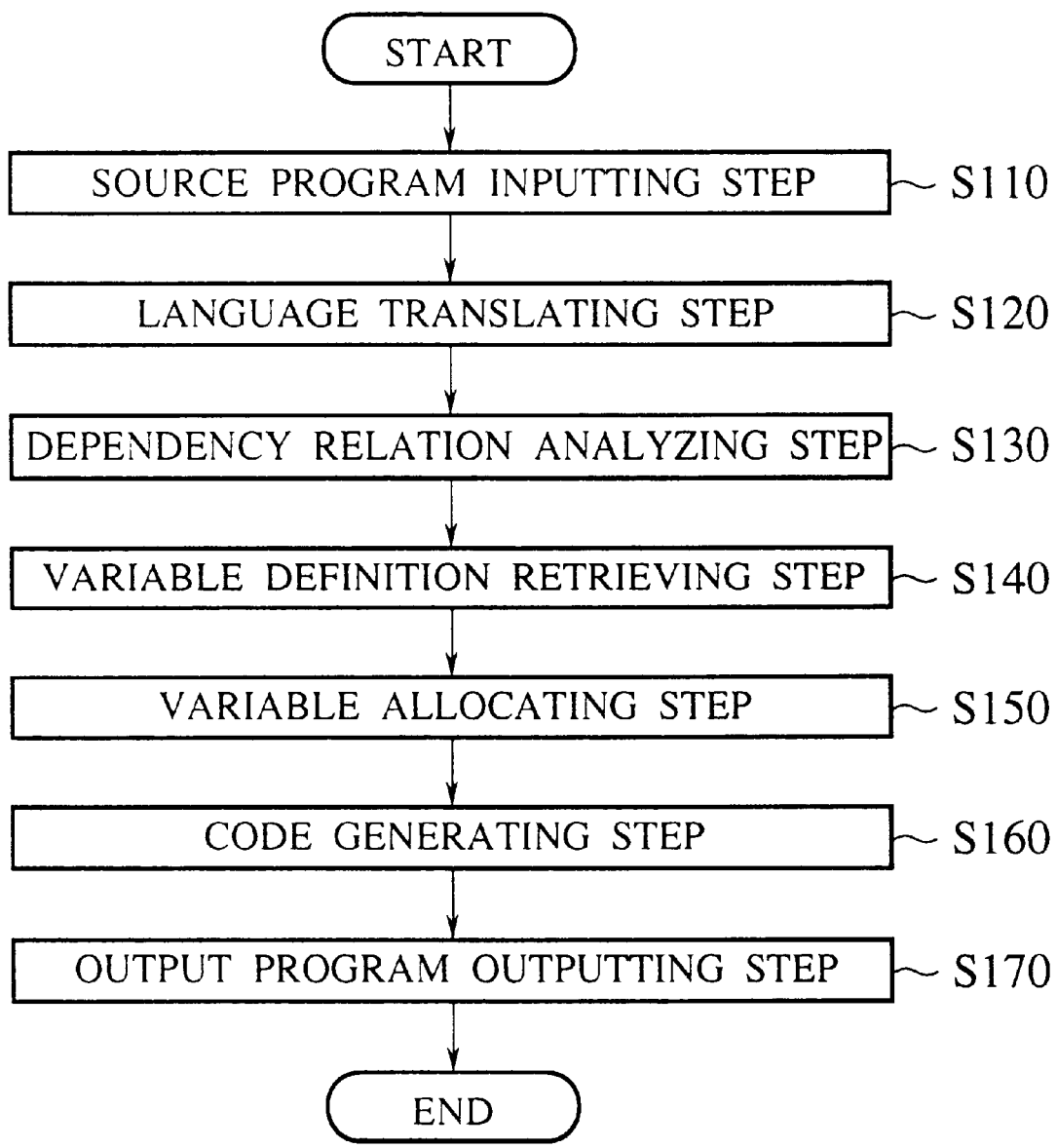
FIG. 7 is a flowchart showing an embodiment of an optimized variable allocation method according to the present invention.

FIG. 7 is a flowchart showing an embodiment of the optimized allocation method according to the present invention. This flowchart is composed of a source program inputting step S110 for reading a source program, a language translating step S120 for processing the entered source program and for generating intermediate code, a dependency relation analyzing step S130 for analyzing the dependency relation of the functions in the intermediate code, a variable definition retrieving step S140 for checking the execution-time access frequency of each variable based on the analyzed dependency relation, a variable allocating step S150 for allocating frequently-accessed variables in a low-order address area, a code generating step S160 for generating object code from the intermediate code containing variables that have been allocated, and an output program outputting step S170 for outputting generated object code.

Figure 9:
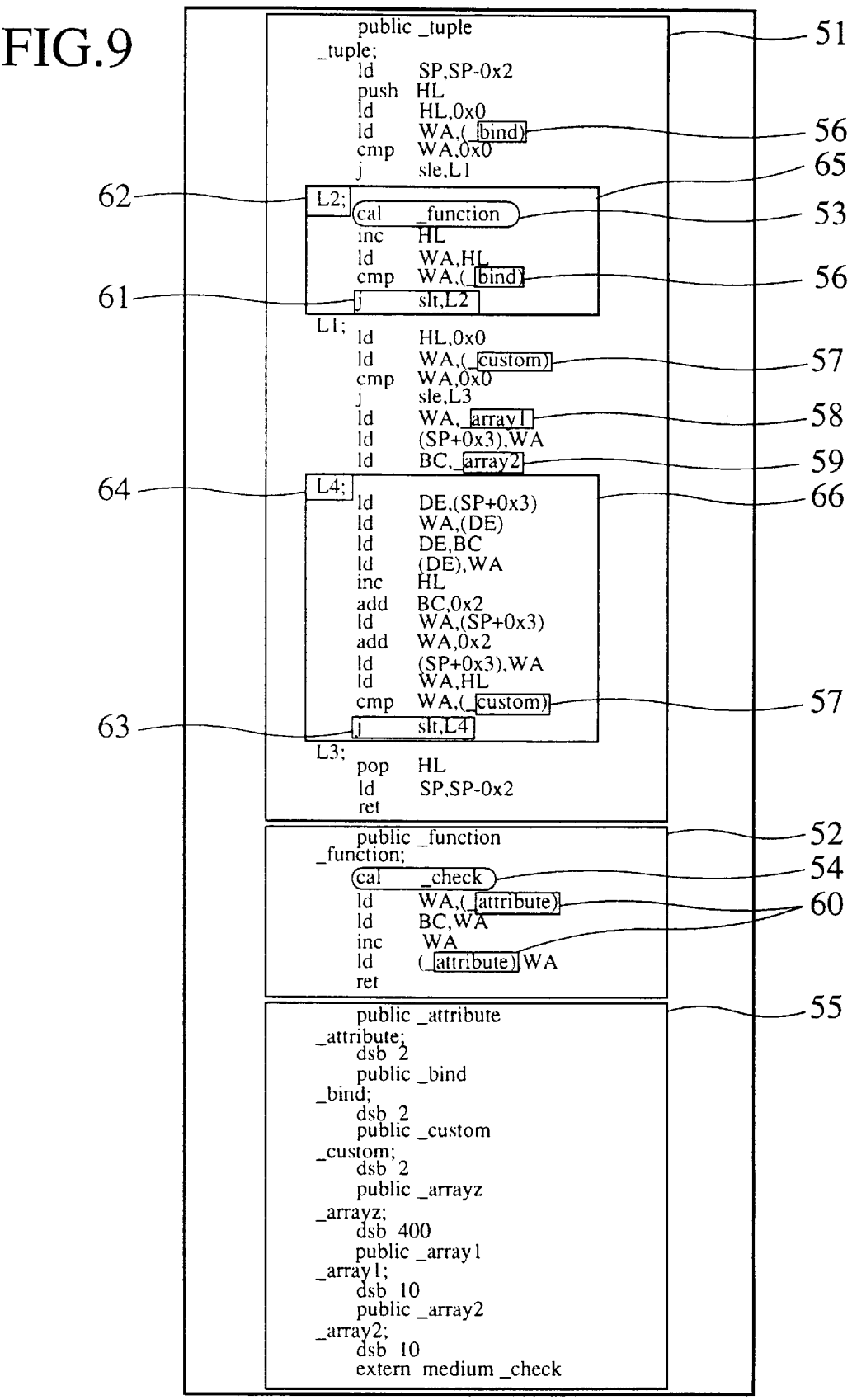
FIG. 9 is a diagram showing intermediate code of the source program of FIG. 8 translated by a language translating module 210.

An embodiment of optimized allocation processing is explained below. FIG. 8 is a source program used to explain the embodiment of the present invention. First, this source program is entered into the processing module 200 from the source program inputting module 100 (step S110). The source program may be in a file, in which case the user enters the name of the file from the keyboard, or may be a source program edited by an editor. The entered source program is translated to intermediate code by the language translating module 210 (step S120). This intermediate code has been optimized by the special intermediate code processing system. FIG. 9 shows optimized intermediate code generated from the source program shown in FIG. 8.

Figures 10, 11:
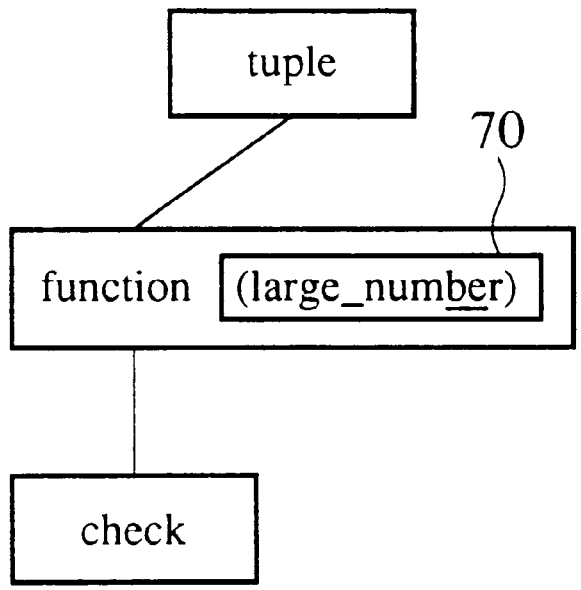
FIG. 10 is a diagram showing the graph data of function dependency.
FIG. 11 is a diagram showing an access frequency data table of external variables.

Next, the dependency relation analyzing module 221 analyzes the dependency of the functions described in the intermediate code shown in FIG. 9 (step S130). In FIG. 9, the instruction groups 51 and 52 each indicate the processing of the functions 'tuple' and 'function'. In the instruction group 51, the statement indicated by the instruction 53 calls the function 'function' from within the function 'tuple'. Similarly, in the function 52, the function call statement 54 calls the function 'check' from within the function 'function'. FIG. 10 is a graph showing the dependency of these functions.

Then, the variable definition retrieving module 222 checks the functions in the graph if they contain iterations (step S140) and, if there is a function containing an iteration, finds how many times it will be iterated. The maximum number of iterations is calculated, if possible, by referencing the variables associated with the iteration; for a function whose iterations cannot be estimated, an appropriate large number is specified. If the graph is weighted, the number of iterations is multiplied by the weight. Then, if a function is called within an iteration, the function in the graph showing the dependency of the functions in FIG. 10 ('function' in FIG. 10) is weighted by an iteration count 70. The module then checks if access will be made to the external variables in the iteration. That is, the module checks the external variables, contained in a declaration table which is the variable definition part 55 in FIG. 9, if some of the external variables in this table will used. For an external variable which will be used in the iteration, the module adds the number of iterations to the external variable access frequency table shown in FIG. 11. The module goes to the next iteration and performs the same processing for the next function.

Figure 12:
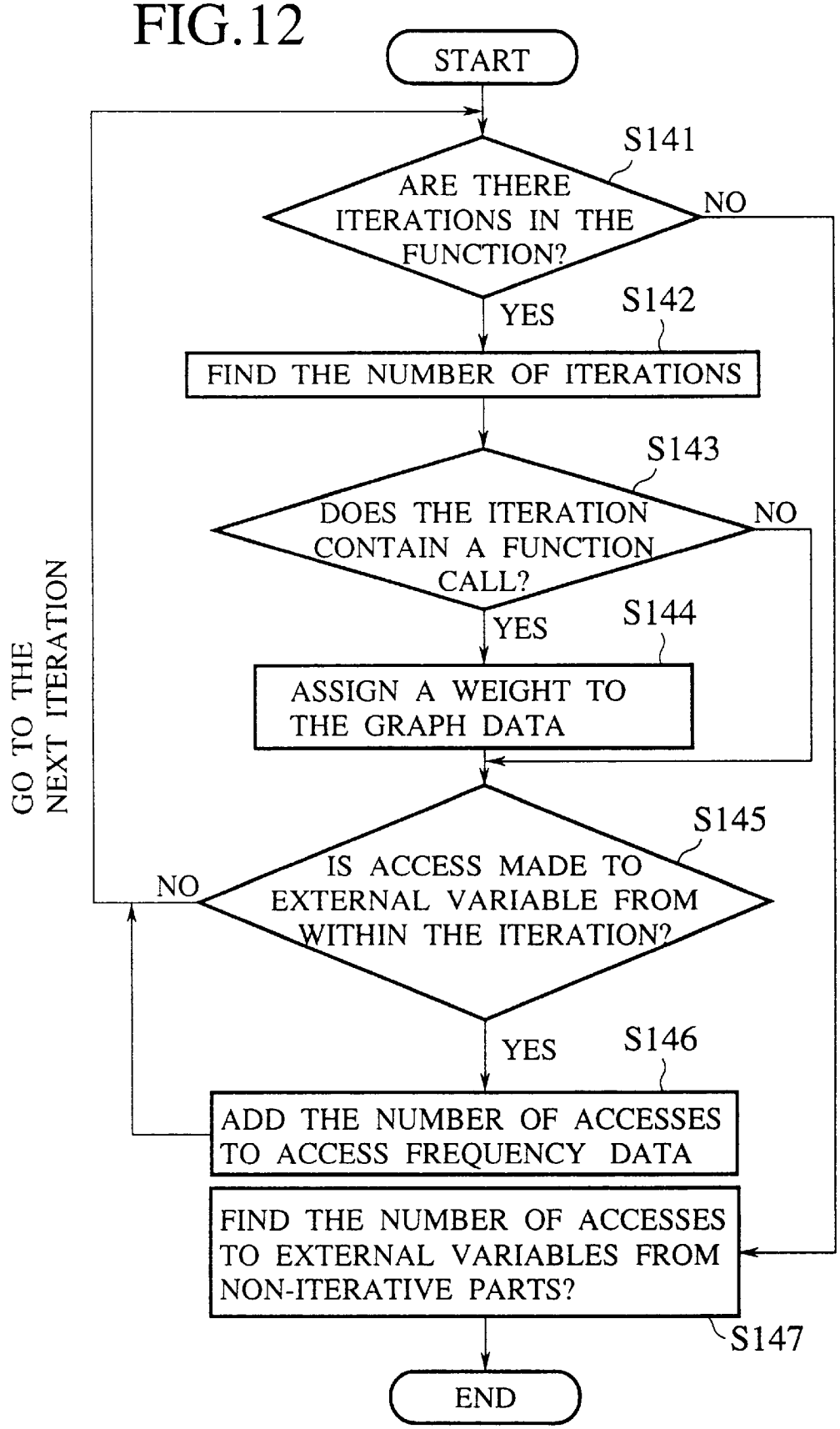
FIG. 12 is a flowchart showing an example of an variable definition retrieving step.

FIG. 12 is a flowchart showing how the variable definition retrieving module 222 finds the access frequency of an external variable in the variable definition retrieving step S140. First, the module checks if the function contained in the entered intermediate code has one or more iterations (step S141). If the function has an iteration, the module checks the number of iterations (step S142) as described above. The module then checks if the iteration contains a function call (step S143) and, if there is, gives a weight, the number of iterations, to the function in the graph data (step S144). Then, the module checks if access is made to external variables from within the iteration (step S145) and, if any, adds the number of accesses to the access frequency data. After processing one iteration, control goes back to step S141 to do processing for the next iteration. After this processing is done for all the iterations in the function, the module checks the number of accesses to the external variables from non-interactive parts of the function (step S147). The processing shown in FIG. 12 is performed for all the functions included in the entered intermediate code.

In FIG. 9, 'bind', 'custom', 'array1', and 'array2', indicated by numerals 56, 57, 58, and 59 are external variables used in the function tuple, and 'attribute' indicated by numeral 60 is an external variable used in the function 'function'. The jump destination of the jump statement 61 is L2 indicated by the label 62. Because control jumps to a backward location, the group indicated by 65, beginning with the label 62 and ending with the jump statement 61, is an iteration part. Similarly, the group 66 beginning with the label L4 indicated by 64 and ending with the jump statement is an iteration part.

The iteration part 65 contains the function 'function' and the external variable 'bind'. As described above, a weight which is an iteration count indicated by 70 (large_number (an appropriate large value)) is assigned to the function 'function' in FIG. 10. For the external variable 'bind', the iteration count is added to the access frequency data table shown in FIG. 11. This is the number of times the external variable 'bind' will be accessed. For the external variable 'attribute' indicated by 60 which is in the weighted function 'function', each access is evaluated as an iteration having as many repetitions as the weight value in itself. In this example, the access frequency of 'attribute' is (2 * large_number). The same operation is repeated thereafter and, as a result, the external variable access frequency data shown in FIG. 11 is created.

Based on this data, the access frequency sequence of external variables is determined. According to this sequence, that is, in the descending sequence of access frequency, the variable allocating module 223 sequentially allocates external variables, with the highest-access-frequency variables in the lowest-order address area (address area which may be specified with fewest number of bits) (step S150). When the lowest-order address area is depleted, the module allocates external variables in the next lowest-order address area. In FIG. 11, the variable 'attribute' is accessed most frequently, followed by the variable 'custom', followed by the variable 'bind'. Considering the free area available in the address area, the module allocates external variables in the low-order address areas in the descending sequence of access frequency. For example, the module allocates the variable 'attribute' in the _tiny area, the variables 'custom' and 'bind' in the _near area, and other variables in the _far area.

Based on the allocation result, the code generating module 224 reflects external variable allocation data on the intermediate code, and generates code (step 160). Then, assembler code is output as an output program (step 170). Step 170 may be omitted if not necessary.

FIG. 5 is a map of object code generated by compiling the source program, shown in FIG. 8, whose external variables are allocated by a programmer, while FIG. 13 shows a map of object code generated by the optimized allocation method according to the present invention. The access object code of the most-frequently-accessed external variable 'attribute' is indicated by numerals 91 and 92 in FIG. 13, while it is indicated by numerals 81 and 82 in FIG. 5 illustrating an example of a conventional method. Comparing these two examples shows that the optimized allocation method according to the present invention has reduced four bytes in each of the two lines. Thus, the optimized variable allocation method and the optimized variable allocation system reduce the size of an object program, improving execution speed.

A computer program implementing the above optimized variable allocation method may be stored on a computer-readable memory. The program may be read from the computer-readable memory into a computer system for execution. The program controls the computer to allocate variables in the optimized manner. Computer-readable memory include units capable of recording programs such as a memory unit, magnetic disk unit, and optical disk unit.

As described above, optimized variable allocation method, the optimized variable allocation system, and a computer-readable memory containing an optimized variable allocation system program automatically allocate frequently-accessed variables in a low-order address area, thus producing instructions with small-sized object code. This reduces the total object code size and speeds up the object program.

It should be understood that many modifications and adaptations of the invention will become apparent to those skilled in the art and it is intended to encompass such obvious modifications and changes in the scope of the claims appended hereto.

What is claimed is:

1. An optimized variable allocation method comprising:
   optimizing a source program by performing language translation on said source program to generate intermediate code;
   analyzing an execution-time access frequency of each variable in said source program by using the intermediate code; and
   allocating said variable, based on the analyzed access frequency, in such a manner that object code generated from said source program is minimized.

2. An optimized variable allocation method comprising:
   optimizing a source program by performing language translation on said source program to generate intermediate code;
   analyzing an execution-time access frequency of each variable in said source program by using the intermediate code; and
   allocating a plurality of variables sequentially in a plurality of areas, based on the analyzed access frequency, with a highest frequency variable in a lowest-order address area.

3. An optimized variable allocation method comprising:
   a source program inputting step for reading a source program;
   a language translating step for performing language translation on said input source program to output intermediate code;
   a dependency relation analyzing step for analyzing a dependency relation among a plurality of functions contained in said intermediate code;
   a variable definition retrieving step for obtaining an execution-time access frequency of each variable based on said analyzed dependency relation;
   a variable allocating step for allocating a plurality of high-access-frequency variables in a low-order address area based on said obtained access frequency;
   a code generating step for generating object code from the intermediate code containing information on said allocated variables; and
   an output program outputting step for outputting said generated object code.

4. An optimized variable allocation method comprising:
   a source program inputting step for reading a source program;
   a language translating step for performing language translation on said input source program to output intermediate code;
   a dependency relation analyzing step for analyzing a dependency relation among a plurality of functions contained in said intermediate code;
   a variable definition retrieving step for obtaining an execution-time access frequency of each variable based on said analyzed dependency relation;
   said variable definition retrieving step comprising the steps of:
      determining whether each of functions contained in said intermediate code contains an iteration part and, if at least one of said functions contains said iteration part, obtaining an iteration count thereof;

assigning a weight, if said iteration part contains a function call, to the function contained in the iteration part, said weight being the obtained iteration count;

adding an access frequency of each of variables to access frequency data if access is made to the variable in said iteration part, said access frequency data representing the access frequency of the variable;

adding the access frequency multiplied by the weight to said access frequency data if access is made to the variable in said weighted function;

a variable allocating step for allocating a plurality of high-access-frequency variables in a low-order address area based on said obtained access frequency; and a code generating step for generating object code from the intermediate code containing information on said allocated variables.

5. An optimized variable allocation method as claimed in claim 4, said variable definition retrieving step further comprising the step of:

obtaining the access frequency of at least one variable outside said iteration part.

6. An optimized variable allocation system comprising:

a source program inputting module for reading a source program;

a language translating module for performing language translation on said input source program to output intermediate code;

a dependency relation analyzing module for analyzing a dependency relation among a plurality of functions contained in said intermediate code;

a variable definition retrieving module for obtaining an execution-time access frequency of each variable based on said analyzed dependency relation;

a variable allocating module for allocating a plurality of high-access-frequency variables in a low-order address area based on said obtained access frequency;

a code generating module for generating object code from the intermediate code containing information on said allocated variables; and an output program outputting module for outputting said generated object code.

7. An optimized variable allocation system comprising:

a source program inputting module for reading a source program;

a language translating module for performing language translation on said input source program to output intermediate code;

a dependency relation analyzing module for analyzing a dependency relation among a plurality of functions contained in said intermediate code;

a variable definition retrieving module for obtaining an execution-time access frequency of each variable based on said analyzed dependency relation;

said variable definition retrieving module comprising:

means for determining whether each of functions contained in said intermediate code contains an iteration part;

means for obtaining an iteration count if at least one of said functions contains said iteration part;

means for assigning a weight, if said iteration part contains a function call, to the function contained in the iteration part, said weight being the obtained iteration count;

means for adding an access frequency of each of variables to access frequency data if access is made to the variable in said iteration part, said access frequency data representing the access frequency of the variable; and means for adding the access frequency multiplied by the weight to said access frequency data if access is made to the variable in said weighted function;

a variable allocating module for allocating a plurality of high-access-frequency variables in a low-order address area based on said obtained access frequency; and a code generating module for generating object code from the intermediate code containing information on said allocated variables.

8. An optimized variable allocation system as claimed in claim 7, said variable definition retrieving module further comprising:

means for obtaining the access frequency of at least one variable outside said iteration part.

9. A computer-readable memory having stored therein an optimized variable allocation program for execution by a computer system, said program comprising:

a process for analyzing an execution-time access frequency of each variable in a source program; and a process for allocating said variable, based on the analyzed access frequency, in such a manner that object code generated from said source program is minimized.

10. A computer-readable memory having stored therein an optimized variable allocation program for execution by a computer system, said program comprising:

a process for analyzing an execution-time access frequency of each variable in a source program; and a process for allocating a plurality of variables sequentially in a plurality of areas, based on the analyzed access frequency, with a highest frequency variable in a lowest-order address area.

11. A computer-readable memory having stored therein an optimized variable allocation program for execution by a computer system as claimed in claim 9, wherein said access frequency analysis comprises:

a process for optimizing said source program by performing language translation on said source program to generate intermediate code; and a process for analyzing the execution-time access frequency using the intermediate code.

12. A computer-readable memory having stored therein an optimized variable allocation program for execution by a computer system as claimed in claim 10, wherein said access frequency analysis comprises:

a process for optimizing said source program by performing language translation on said source program to generate intermediate code; and a process for analyzing the execution-time access frequency using the intermediate code.

13. A computer-readable memory having stored therein an optimized variable allocation program for execution by a computer system, said program comprising:

a source program inputting step for reading a source program;

a language translating step for performing language translation on said input source program to output intermediate code;

a dependency relation analyzing step for analyzing a dependency relation among a plurality of functions contained in said intermediate code;

a variable definition retrieving step for obtaining an execution-time access frequency of each variable based on said analyzed dependency relation;

a variable allocating step for allocating a plurality of high-access-frequency variables in a low-order address area based on said obtained access frequency; and a code generating step for generating object code from the intermediate code containing information on said allocated variables.

14. A computer-readable memory having stored therein an optimized variable allocation program for execution by a computer system as claimed in claim 13, further comprising:

an output program outputting step for outputting said generated object code.

15. A computer-readable memory having stored therein an optimized variable allocation program for execution by a computer system as claimed in claim 13 wherein said variable definition retrieving step comprises:

a process for determining whether each of functions contained in said intermediate code contains an iteration part;

a process for obtaining an iteration count if at least one of functions contains said iteration part;

a process for assigning a weight, if said iteration part contains a function call, to the function contained in the iteration part, said weight being the obtained iteration count;

a process for adding an access frequency of each of variables to access frequency data if access is made to the variable in said iteration part, said access frequency data representing the access frequency of the variable; and a process for adding the access frequency multiplied by the weight to said access frequency data if access is made to the variable in said weighted function.

16. A computer-readable memory having stored therein an optimized variable allocation program for execution by a computer system as claimed in claim 15, further comprising:

means for obtaining the access frequency of at least one variable outside said iteration part.

* * * * *